US012808238B2

(12) United States Patent
Nagata et al.

(10) Patent No.: US 12,808,238 B2
(45) Date of Patent: Nov. 24, 2026

(54) SYSTEMS, DEVICES, AND METHODS FOR A TOUCH AND/OR PRESSURE ACTIVATED VEHICLE DOOR LATCH

(71) Applicant: Toyota Motor Engineering & Manufacturing North America, Inc., Plano, TX (US)

(72) Inventors: Katsumi Nagata, Foster City, CA (US); Yusuke Takeuchi, Cupertino, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 27 days.

(21) Appl. No.: 19/039,653

(22) Filed: Jan. 28, 2025

(65) Prior Publication Data

US 2026/0218547 A1 Jul. 30, 2026

(51) Int. Cl.
*E05B 81/76* (2014.01)

(52) U.S. Cl.
CPC .................................... *E05B 81/77* (2013.01)

(58) Field of Classification Search
CPC ........................................................ E05B 81/77
USPC ......................................................... 340/5.72
See application file for complete search history.

(56) References Cited

U.S. PATENT DOCUMENTS 5,793,881 A * 8/1998 Stiver .................. E05B 1/0015 382/116
9,677,313 B2 6/2017 Nishikibe et al.
9,797,181 B2 10/2017 Wheeler et al.
10,053,893 B1 8/2018 Patel et al.
10,641,015 B2 5/2020 Ring
2007/0171057 A1 7/2007 Ogino et al.
2007/0271974 A1* 11/2007 Jankowski .............. E05B 77/06 70/237

(Continued)

FOREIGN PATENT DOCUMENTS

CN 204386306 U * 6/2015
CN 111764747 A * 10/2020 ......... G06V 40/1306

(Continued)

OTHER PUBLICATIONS

"What is e-Latch by Lexus?" from J.D. Power; 11 pages; https://www.jdpower.com/cars/shopping-guides/what-is-e-latch-by-lexus.

*Primary Examiner* — Kam Wan Ma

(74) *Attorney, Agent, or Firm* — Snell & Wilmer LLP

(57) ABSTRACT

Methods, systems, and devices for a door latch system for a vehicle. The system may include a door latch coupled to a door of the vehicle. The door latch may prevent the door moving from a closed position to an open position until the door latch is actuated. The system may include one or more pressure sensors coupled to the door. The one or more pressure sensors may detect pressure data corresponding to a user pressing the one or more pressure sensors. The system may include an electronic control unit (ECU) coupled to the door latch and the one or more pressure sensors. The ECU may determine a size of a hand of the user based on the pressure data. The ECU may actuate the door latch to open the door when the determined size of the hand is equal to or greater than a hand size threshold.

20 Claims, 7 Drawing Sheets

(56) References Cited

U.S. PATENT DOCUMENTS

| | | | | |
|---|---|---|---|---|
| 2014/0069015 | A1* | 3/2014 | Salter | E05B 81/00<br>49/31 |
| 2014/0303852 | A1* | 10/2014 | Seki | E05F 15/40<br>701/49 |
| 2018/0238099 | A1 | 8/2018 | Schatz et al. | |
| 2018/0252005 | A1* | 9/2018 | Magner | E05B 85/06 |
| 2022/0061692 | A1* | 3/2022 | Marcolino Quintao Severgnini | A61B 5/165 |
| 2022/0407514 | A1 | 12/2022 | Cannon et al. | |
| 2023/0067991 | A1* | 3/2023 | Takizawa | E05B 81/77 |
| 2024/0018822 | A1 | 1/2024 | Muh et al. | |

FOREIGN PATENT DOCUMENTS

| | | | | | |
|---|---|---|---|---|---|
| CN | 113108817 | A | | 7/2021 | |
| CN | 221476892 | U | * | 8/2024 | |
| CN | 223925985 | U | * | 2/2026 | |
| JP | 2016156161 | A | | 9/2016 | |
| JP | 2024029844 | A | | 3/2024 | |
| WO | WO-2022233978 | A1 | * | 11/2022 | E05B 85/12 |
| WO | 2023135147 | A1 | | 7/2023 | |
| WO | 2023156148 | | | 8/2023 | |

* cited by examiner

SYSTEMS, DEVICES, AND METHODS FOR A TOUCH AND/OR PRESSURE ACTIVATED VEHICLE DOOR LATCH

BACKGROUND

1. Field

The present disclosure relates to systems, devices, and/or methods for an electronic door latch for a vehicle.

2. Description of the Related Art

Certain vehicles may be equipped with electronic door latches that may be actuated by pressing a button to open a door of the vehicle. These current electronic door latches may require less physical effort to actuate compared to mechanical door latches that are actuated by pulling a door handle, for example. However, these current electronic door latches may feel unnatural for users since many users are not accustomed to opening a door by first pressing a button, and second, pushing the door. Moreover, users may find it difficult to find the button that actuates the door or may not even know to look for the button. In some cases, a child can easily unintentionally open a door using current electronic door latches by simply pressing the button.

Accordingly, it is desirable to provide systems, devices, and methods for an electronic door latch for a vehicle.

SUMMARY

In general, one aspect of the subject matter described in this disclosure may be embodied in a door latch system for a vehicle. The door latch system may include a body of the vehicle. The door latch system may include a door coupled to the body. The door may be configured to move between a closed position and an open position for ingress and egress of the vehicle by a user. The door latch system may include a door latch coupled to the door. The door latch may be configured to prevent the door moving from the closed position to the open position until the door latch is actuated. The door latch system may include one or more pressure sensors coupled to an interior surface of the door. The one or more pressure sensors may be configured to detect pressure data corresponding to the user pressing the one or more pressure sensors. The door latch system may include an electronic control unit (ECU) coupled to the door latch and the one or more pressure sensors. The ECU may be configured to receive the pressure data from the one or more pressure sensors when the user presses the one or more pressure sensors. The ECU may be configured to determine a total force exerted on the one or more pressure sensors based on the received pressure data. The ECU may be configured to determine a size of a hand of the user based on the received pressure data. The ECU may be configured to actuate the door latch to open the door when the determined total force is equal to or greater than an opening force threshold, and the determined size of the hand is equal to or greater than a hand size threshold.

In one aspect, the subject matter may be embodied in a door latch system for a vehicle. The door latch system may include a body of the vehicle. The door latch system may include a door coupled to the body. The door may be configured to move between a closed position and an open position for ingress and egress of the vehicle by a user. The door latch system may include a door latch coupled to the door. The door latch may be configured to prevent the door moving from the closed position to the open position until the door latch is actuated. The door latch system may include one or more pressure sensors coupled to an interior surface of the door. The one or more pressure sensors may be configured to detect pressure data corresponding to the user pressing the one or more pressure sensors. The door latch system may include an electronic control unit (ECU) coupled to the door latch and the one or more pressure sensors. The ECU may be configured to receive hand scan data corresponding to one or more scans of one or more hands. The hand scan data may indicate a size of each of the one or more hands. The ECU may be configured to receive the pressure data from the one or more pressure sensors when the user presses the one or more pressure sensors. The ECU may be configured to determine a size of a hand of the user based on the received pressure data. The ECU may be configured to actuate the door latch to open the door when the determined size of the hand is equal to or greater than a hand size threshold. The hand size threshold may be based on the received hand scan data.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

DETAILED DESCRIPTION

Figure 1:
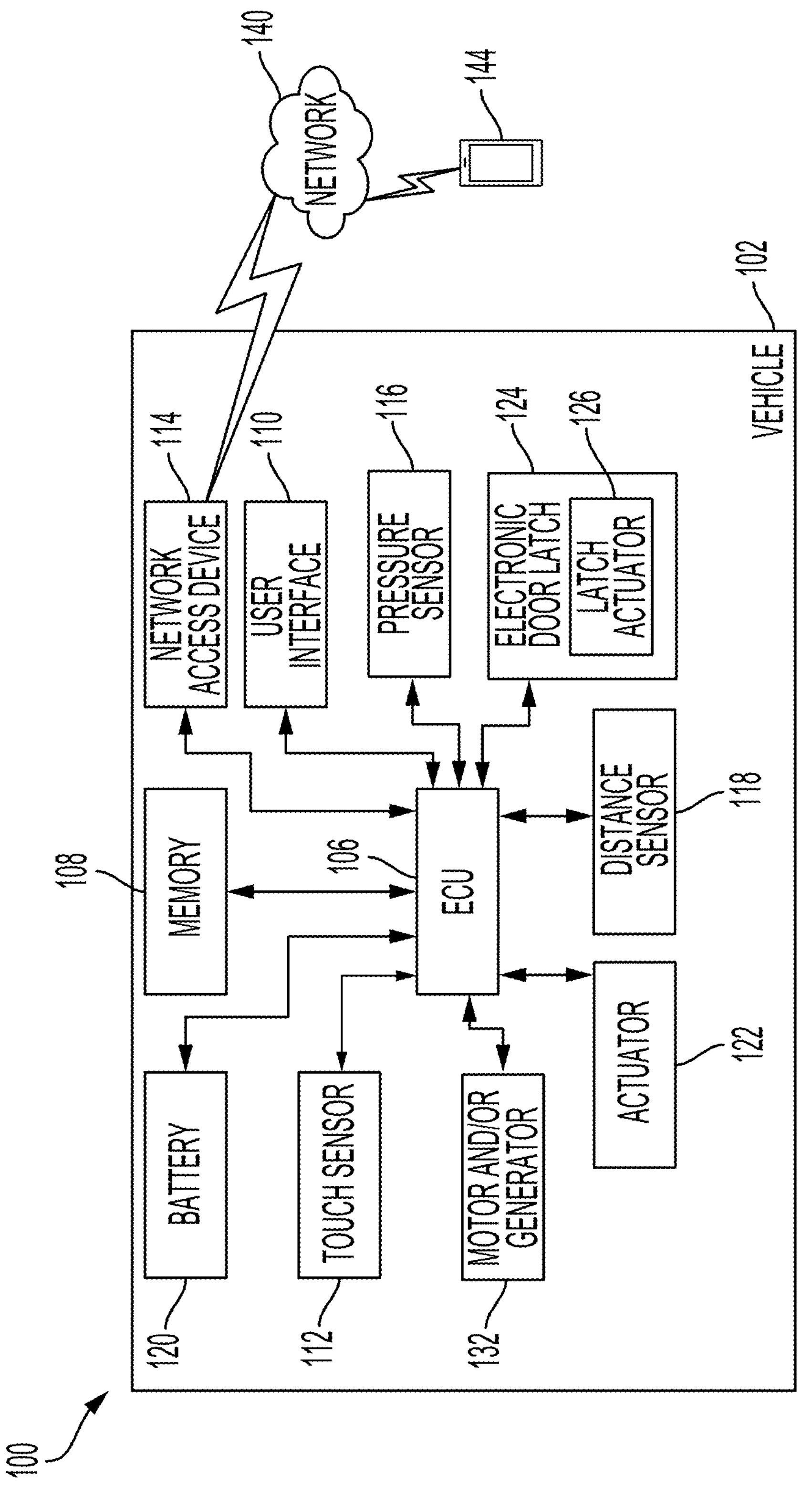
FIG. 1 is a block diagram of an example door latch system for a vehicle according to an aspect of the disclosure.

Disclosed herein are systems, devices, methods, and/or vehicles for implementing a door latch system. The door latch system may include one or more pressure sensors coupled to a door (e.g., to an interior panel of the door) of a vehicle and an electronic door latch coupled to the door. The one or more pressure sensors may be configured to detect pressure data corresponding to a user pressing the one or more pressure sensors. The door latch system may actuate the electronic door latch such that the door may be opened based on the detected pressure data. Particular embodiments of the subject matter described in this disclosure may be implemented to realize one or more of the following advantages.

The door latch system may be configured to determine a size of a hand of the user based on the pressure data. The door latch system may be configured to actuate the electronic door latch when the determined size of the hand of the user is greater than or equal to a hand size threshold. The door latch system may be configured to stop or prevent the electronic door latch from being actuated such that the door remains closed when the determined size of the hand of the user is less than the hand size threshold. Accordingly, the door latch system may have the benefit of preventing children (and/or young users and/or unauthorized users) from opening the door.

The door latch system may be configured to receive hand scan data that indicates or includes a size of one or more hands belonging to one or more respective users. The hand size threshold may be set based on the received hand scan data. For example, the one or more pressure sensors and/or one or more touch sensors of the door latch system (or other sensors that are connected to or separate from the door latch system) may scan the one or more hands and provide the corresponding hand scan data to the door latch system. A user (e.g., an owner of the vehicle) may set the hand size threshold based on their hand size, for example, such that users with smaller hands may not open the door. In examples, multiple users (e.g., certain members of a family) may scan or manually enter their hand size (e.g., via a user interface of the vehicle and/or a user device in communication with the door latch system) such that the hand size threshold includes multiple stored hand sizes enabling the multiple users to open the door. Users with smaller hands and/or a different hand size than the stored hand sizes may be prevented from opening the door.

The door latch system may be configured to determine a total force exerted on the one or more pressure sensors based on the pressure data. The door latch system may be configured to actuate the electronic door latch such that the door opens when the determined total force is greater than or equal to an opening force threshold. Accordingly, the door latch system may have the benefit of preventing unintentional opening of the door by requiring a certain degree of force to be exerted on the one or more pressure sensors to open the door.

The door latch system may be configured to stop or prevent the electronic door latch from being actuated such that the door remains closed when the determined total force is greater than or equal to a maximum opening force threshold. Accordingly, the door latch system may have the benefit of preventing the door from being opened too quickly and/or with too much force by not actuating the electronic door latch when too much force is being exerted on the one or more pressure sensors.

The door latch system may be configured to stop (e.g., by controlling one or more actuators coupled to the door) movement of the door when the door is being opened from a closed position to an open position when the user stops pressing on the one or more pressure sensors. Accordingly, the door latch system may have the benefit of preventing the door from being opened too widely (and, e.g., hitting an object) by allowing the user to quickly and easily stop the movement of the door.

The door latch system may be configured to stop or prevent the actuation of the electronic door latch and/or to stop (e.g., by controlling the one or more actuators) the movement of the door when the door latch system determines (e.g., based on data received from one or more distance sensors) that the door may contact one or more objects if opened or if opened further. Accordingly, the door latch system may have the benefit of preventing the door from contacting objects that are positioned in a swing path of the door.

FIG. 1 is a block diagram for an example door latch system 100 (also can be referred to as an electronic vehicle door latch system 100). The door latch system 100 or a portion thereof may be retrofitted, coupled to, include, or be included within a vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a plug-in hybrid vehicle, a hydrogen fuel cell vehicle, or any other type of vehicle that has a fuel cell, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The vehicle 102 may include a motor and/or generator 132 and/or a battery 120. The motor and/or generator 132 may be located within an engine bay of the vehicle 102. For example, the motor and/or generator 132 may be an internal combustion engine (ICE). In this regard, the motor and/or generator 132 may combust an air and fuel mixture to provide power to the vehicle 102 and/or components of the vehicle 102 and/or the door latch system 100. Accordingly, the motor and/or generator 132 can cause the vehicle 102 to accelerate, decelerate, or maintain a desired velocity. The motor and/or generator 132 may include combinations of an ICE and an electric motor, such as for hybrid electric vehicle (HEV) applications, for example. In examples, the motor and/or generator 132 may be an electric motor, such as for battery electric vehicle (BEV) applications, for example. In this regard, the motor and/or generator 132 may be an electric motor and an electric generator that converts electrical energy into mechanical power, such as torque, and converts mechanical power into electrical energy. The motor and/or generator 132 may be electrically connected to the battery 120. The motor and/or generator 132 may convert energy from the battery 120 into mechanical power, and may provide energy back to the battery 120, for example, via regenerative braking. The battery 120 may be electrically connected to the motor and/or generator 132 and may provide electrical energy to and/or receive electrical energy from the motor and/or generator 132. The battery 120 may provide electrical energy to the door latch system 100.

The door latch system 100 and/or the vehicle 102 may further include one or more processors, such as an electronic control unit (ECU) 106. The ECU 106 may be implemented as a single ECU or in multiple ECUs. The ECU 106 may be electrically connected to some or all of the components of the vehicle 102 and/or the door latch system 100 (e.g., via a controller area network (CAN) bus and/or other protocols). For example, the ECU 106 may be electrically connected to the motor and/or generator 132, the battery 120, a memory 108, a user interface 110, a network access device 114, an electronic door latch 124, one or more pressure sensors 116, one or more touch sensors 112, one or more actuators 122, and/or one or more distance sensors 118. The ECU 106 may include one or more processors (or controllers) specifically designed for controlling operations of the vehicle 102, such as accelerating, braking, autonomous driving, blind spot detection, parking (or parking assistance), etc. In examples, the ECU 106 may be and/or include an advanced driver assistance systems (ADAS) sensor fusion ECU, a panoramic view monitor (PVM) ECU, an engine control module (ECM), a transmission control module (TCM), a telematics control unit (TCU), an inertial measurement unit (IMU), an in-vehicle infotainment (IVI) ECU, and/or a graphics processing unit (GPU).

The door latch system 100 and/or the vehicle 102 may further include the memory 108. The memory 108 may be electrically connected to the ECU 106. In examples, the memory 108 may be communicatively coupled (e.g., via a network 140 and/or the network access device 114) to the ECU 106 such that the memory 108 is remote from the ECU 106 and/or the vehicle 102. In other examples, the memory 108 may be electrically connected to the ECU 106 and a remote memory (e.g., a remote database) may be communicatively coupled to the ECU 106, with the remote memory having similar, additional, and/or different functions as the memory 108 (e.g., greater storage capacity, enabling over-the-air updates, etc.). The memory 108 may store instructions to execute on the ECU 106 and may include one or more of a random access memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. The memory 108 may store, for example, vehicle parameters (e.g., vehicle weight, vehicle length, vehicle width, vehicle height, transmission gear information, etc.).

The door latch system 100 and/or the vehicle 102 may further include the user interface 110. The user interface 110 may be located within a cabin of the vehicle 102 (e.g., coupled to a dashboard of the vehicle 102). The user interface 110 may provide an interface to a user of the vehicle 102 (e.g., a driver and/or a passenger of the vehicle 102) to interact with and/or receive output from the ECU 106. The user interface 110 may have a user interface element, such as a screen and/or a touchscreen with a button, a switch, a microphone, a speaker, a gesture monitoring sensor, a knob, a graphical user interface (GUI), and/or other input/output devices electrically connected to the ECU 106 to provide input and/or output of information (or data) to and/or from the ECU 106.

The door latch system 100 and/or the vehicle 102 may further include the network access device 114. The network access device 114 may be electrically connected to the ECU 106 and may include a communication port or channel, such as one or more of a Wi-Fi unit, a Bluetooth® unit, a Radio Frequency Identification (RFID) tag or reader, a DSRC unit, a satellite network unit, and/or a cellular network unit for accessing the network 140 (e.g., CDMA, GSM, 3G, 4G, 5G, etc.). The network access device 114 may transmit data to and receive data from devices and systems not directly connected to the vehicle 102. For example, the ECU 106 may communicate with a user device 144 (e.g., a key fob of the vehicle 102, a mobile device, a phone, a tablet, a laptop, etc.) via the network access device 114.

Figure 2:
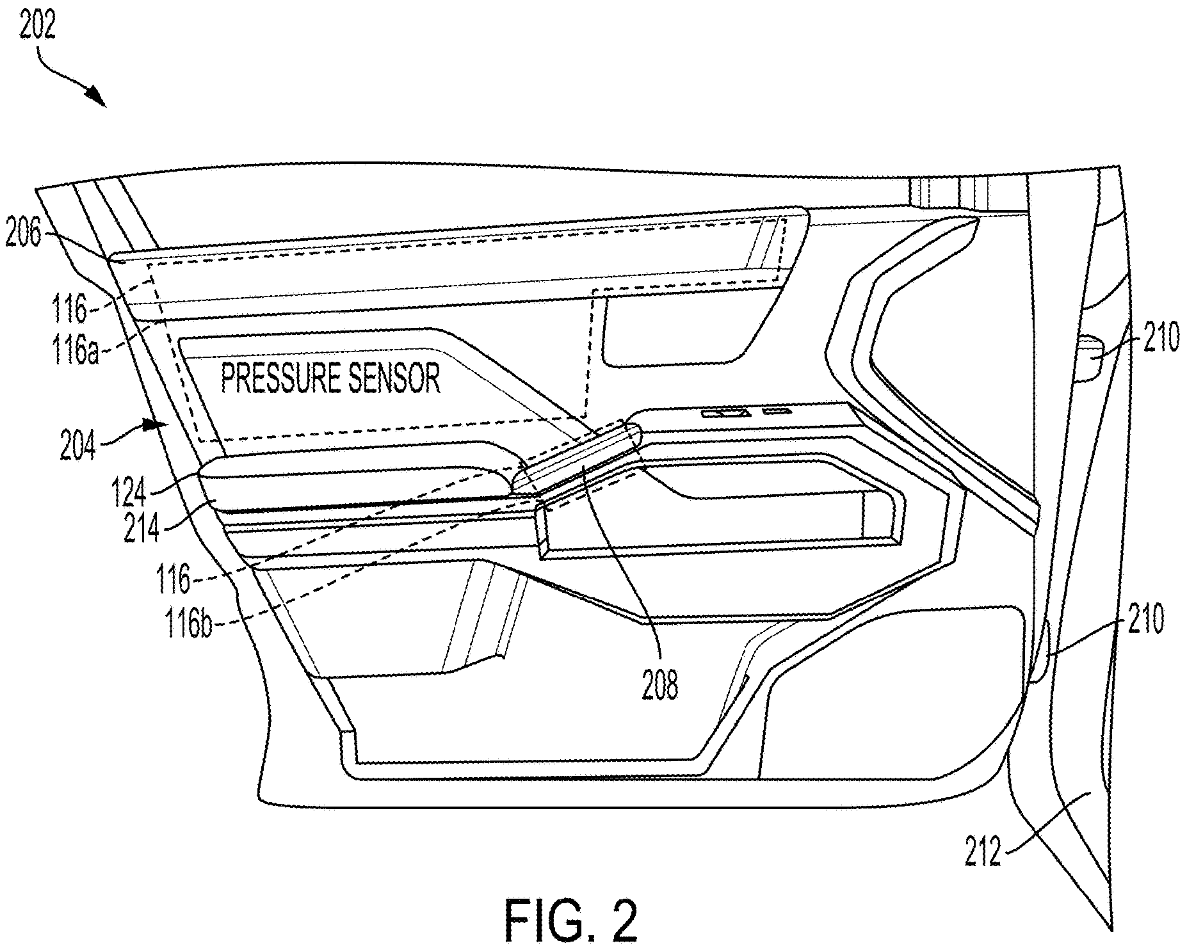
FIG. 2 illustrates a door of a vehicle including the example door latch system of FIG. 1 according to an aspect of the disclosure.

FIG. 2 is a schematic illustrating a front view of a door 202 (e.g., a front left door 202) of the vehicle 102 including the door latch system 100. With combined reference to FIGS. 1 and 2, the door latch system 100 and/or the vehicle 102 may further include a plurality of doors 804 (marked in FIG. 8), with the plurality of doors 804 including the door 202. The vehicle 102 and/or the door latch system 100 may include one (1) door, two (2) doors, four (4) doors, or any other quantity of doors. Each of the plurality of doors 804 may be moveably coupled (e.g., via one or more hinges 210) to a main body 212 of the vehicle 102 such that each of the plurality of doors 804 may move or swing between a closed position (e.g., to enclose the cabin of the vehicle 102) and an open position (e.g., to allow a driver and/or one or more passengers to enter or exit the cabin of the vehicle 102). Although FIG. 2 illustrates a front left door of the vehicle 102 (i.e., the door 202), the door latch system 100 may be implemented in any other door(s) of the plurality of doors 804 (e.g., a front right door, a rear left door, a rear right door, etc.) in the same or similar manner as the door 202.

Each of the plurality of doors 804 (marked in FIG. 8) may include an interior door panel, such as an interior door panel (or door panel) 204 of the door 202. The door panel 204 may form an interior surface of the door 202. The door panel 204 may include one or more input devices (e.g., buttons, switches, touchscreens, etc.) for controlling components of the vehicle 102 (e.g., one or more windows, a tailgate, sideview mirrors, etc.). The door panel 204 may further include a door panel upper (or upper door trim) 206, an armrest 214, and/or a handle 208. The door panel upper 206 may form an upper portion (or upper end) of the door panel 204 and/or may be positioned above the armrest 214, for example. The handle 208 may be configured to be grasped, pulled, and/or pushed by a user (e.g., a driver and/or a passenger of the vehicle 102) to open or close the door 202. For example, the handle 208 may be configured such that a hand of the user may wrap around the handle 208 when the user grasps the handle 208. In examples, the handle 208 may be and/or include a recess (e.g., that is positioned in or adjacent to the armrest 214) such that the hand of the user does not wrap around the handle 208 when the user grasps the handle 208, but instead is at least partially inserted into the recess when the user grasps the handle 208 (e.g., the handle 208 may have a rectangular cup-like shape).

The door latch system 100 may further include the electronic door latch 124. The electronic door latch 124 may be coupled to the door 202 and electrically connected to the ECU 106. In examples, the door latch system 100 may include a plurality of electronic door latches (e.g., with at least one electronic door latch being coupled to each respective door of the plurality of doors 804 (marked in FIG. 8) of the vehicle 102). The electronic door latch 124 may be configured to receive and/or latch on to a door striker plate (and/or a clip, a hook, a rod, etc.) that is coupled to the main body 212 of the vehicle 102 to hold the door 202 in the closed position. Moreover, the electronic door latch 124 may be configured to release the door striker plate (e.g., when actuated) such that the door 202 may be opened.

The electronic door latch 124 may be electronically actuated (e.g., by being controlled by the ECU 106) to release the door striker plate instead of being mechanically actuated. For example, instead of a mechanical linkage and/or a pull cable connecting the electronic door latch 124 to a lever (e.g., a door handle) for actuating the electronic door latch 124 mechanically, the electronic door latch 124 may include one or more latch actuators 126 (e.g., one or more electric motors, one or more pneumatic motors, one or more hydraulic motors, etc.) that are configured to actuate the electronic door latch 124 to release the door striker plate upon being controlled by the ECU 106. In examples, the electronic door latch 124 may be electronically actuated and mechanically actuated.

The door latch system 100 may further include the one or more pressure sensors 116. The one or more pressure sensors 116 may be electrically connected to the ECU 106 and coupled to the door 202. In examples, the door latch system 100 may include a plurality of pressure sensors (e.g., with at least one pressure sensor being coupled to each respective door of the plurality of doors 804 (marked in FIG. 8) of the vehicle 102). The one or more pressure sensors 116 may be coupled to an interior surface of the door 202, such as the door panel 204. For example, the one or more pressure sensors 116 may include one or more first pressure sensors 116*a* coupled to the door panel upper 206 and/or one or more second pressure sensors 116*b* coupled to the handle 208 (in examples, the one or more pressure sensors 116 may be coupled to other portions and/or components of the door 202 such as a window frame, a lower door panel portion, etc.). In examples, the one or more pressure sensors 116 may be positioned beneath an interior surface of the door panel 204 (e.g., at the door panel upper 206 and/or the handle 208). The interior surface of the door panel 204 may face towards the cabin of the vehicle 102. The one or more pressure sensors 116 may be and/or include one or more resistive pressure sensors, one or more capacitive pressure sensors, and/or one or more piezoelectric sensors, for example (in examples, the one or more pressure sensors 116 may be and/or include a different type of pressure sensor).

The one or more pressure sensors 116 may be configured to measure, detect, and/or determine pressure applied by a hand of a user (e.g., a driver and/or a passenger of the vehicle 102) to the one or more pressure sensors 116. For example, the one or more pressure sensors 116 may be configured to measure, detect, and/or determine pressure data corresponding to pressure applied to the one or more pressure sensors 116 that are coupled to the door panel upper 206 and/or the handle 208 by the hand of the user (or pressure applied to any other portion and/or component of the door 202 or the vehicle 102 that includes at least one of the one or more pressure sensors 116).

The pressure data may indicate a total pressure on the one or more pressure sensors 116 applied by the hand of the user. The total pressure may be based on an amount of force the user exerts on the one or more pressure sensors 116 and a size of the user's hand, for example. In examples, the ECU 106 may be configured to determine the total pressure based on the pressure data. The pressure data may indicate a size (e.g., in square centimeters (cm^2)) of a pressured area on the one or more pressure sensors 116. The pressured area may be an area (or portion) of the one or more pressure sensors 116 that is pressed by the hand of the user. In examples, the ECU 106 may be configured to determine the size and/or shape of the pressured area based on the pressure data.

Figure 3:
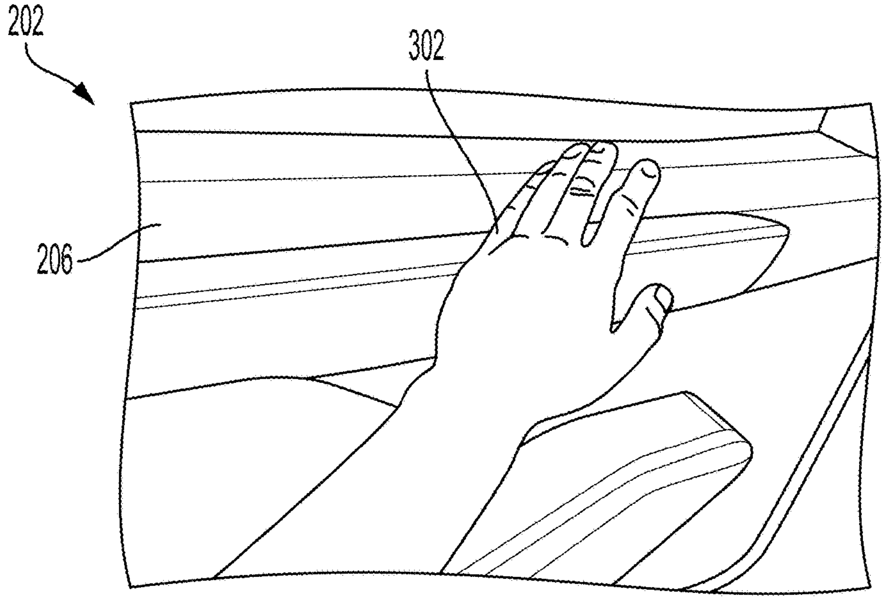
FIG. 3 illustrates a hand of a user pressing on the door of FIG. 2 according to an aspect of the disclosure.
Figure 4:
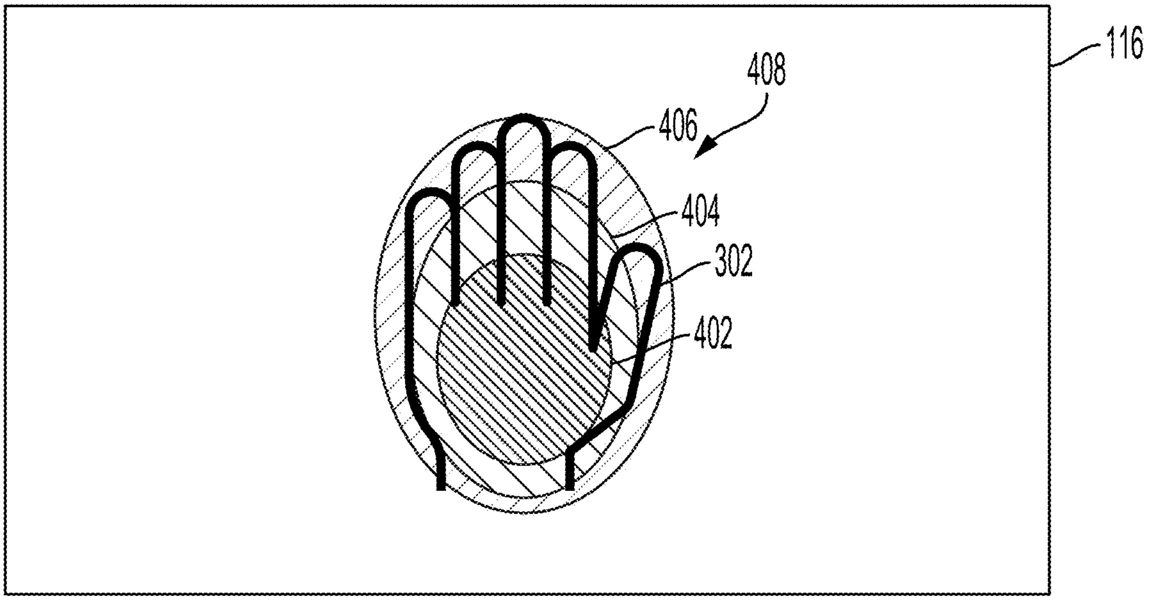
FIG. 4 illustrates an example pressure map indicated in pressure data that is detected by one or more pressure sensors and corresponds to an adult user pressing the one or more pressure sensors according to an aspect of the disclosure.

FIG. 3 illustrates an adult hand 302 (e.g., a hand of an adult driver or an adult passenger of the vehicle 102) pressing the door panel upper 206 (and accordingly also pressing the one or more pressure sensors 116) and FIG. 4 illustrates the one or more pressure sensors 116 detecting pressure data corresponding to the adult hand 302 pressing the door panel upper 206 (in examples, the pressure data may correspond to the adult hand 302 pressing another location and/or component of the vehicle 102 that includes at least one of the one or more pressure sensors 116). As used herein, "adult" may refer to a user who is eighteen (18) years old or older and "child" may refer to a user who is less than eighteen (18) years old, however, the definition (e.g., the ages that correspond to an "adult" or a "child") of an "adult" and/or a "child" may be set/determined as desired (e.g., an "adult" may refer to a mature user) or set/determined by the laws of a particular region or country. Also, "adult" may refer to a user with hands that are a particular size or larger and/or able to push the door with a particular force or greater. "Child" may refer to a user with hands that are a particular size or smaller and/or have less pushing force on the door than an adult or a preset or predetermined (hand size or door pressure) threshold.

With combined reference to FIGS. 3 and 4 and continuing reference to FIGS. 1 and 2, the pressure data may indicate a distribution of pressure on the one or more pressure sensors 116. For example, the pressure data may include or indicate a pressure map 408 that corresponds to the distribution of pressure detected by the one or more pressure sensors 116. The pressure map 408 may indicate one or more pressures such as a first pressure 402, a second pressure 404, and/or a third pressure 406. The second pressure 404 may be less than the first pressure 402 and greater than the third pressure 406 (in examples, the one or more pressures 402, 404, and 406 may have a different order from least to greatest). In examples, the total pressure may be based on a sum of the one or more pressures 402, 404 and 406.

A position, a shape, and/or a relative size of the one or more pressures 402, 404, and 406 on the pressure map 408 may be based on, for example, an amount of force exerted by the user when pressing the one or more pressure sensors 116, a size of the adult hand 302, and/or a shape of the adult hand 302 (e.g., fingers together, fingers spread open, etc.). For example, although FIG. 4 illustrates the one or more pressures 402, 404, and 406 as having oval shapes on the pressure map 408, the one or more pressures 402, 404, and 406 may have any shape based on how the pressure is distributed when the adult hand 302 presses against the one or more pressure sensors 116. Moreover, in examples, the pressure data and/or the pressure map 408 may indicate one (1) pressure (e.g., either the first pressure 402, the second pressure 404, or the third pressure 406) or may indicate more than three (3) pressures such as four (4) or more pressures (e.g., for greater granularity in detecting the distribution of the pressure).

In examples, the one or more pressure sensors 116 may detect numerous pressures (e.g., in increments of one (1) pascal (Pa) or less) when the adult hand 302 presses the one or more pressure sensors 116, but may categorize the numerous pressures into one or more pressure categories. For example, the first pressure 402 may be a high pressure category of the one or more pressure categories that represents a high pressure range (e.g., greater than or equal to 5000 pascals (Pa) or any other pressure), the second pressure 404 may be an intermediate pressure category of the one or more pressure categories that represents a medium pressure range (e.g., between 3000 and 5000 pascals (Pa) or any other pressure(s)), and the third pressure 406 may be a low pressure category of the one or more pressure categories that represents a low pressure range (e.g., less than or equal to 3000 pascals (Pa) or any other pressure). In examples, each of the one or more pressure categories may correspond to any pressure range as desired. For example, each of the one or more pressure categories may be set based on an average hand size of users (e.g., adults and/or children), an average force required to open the door 202, etc. In examples, the one or more pressure categories may include one (1) pressure category, two (2) pressure categories, or more than three (3) pressure categories.

In examples, the one or more pressure sensors 116 may detect numerous pressures (e.g., in increments of one (1) pascal (Pa) or less) when the adult hand 302 presses the door panel upper 206 (or the handle 208), but may average and/or smooth the numerous pressures such that the pressure map 408 illustrates a gradient.

The size of a pressure map (e.g., the pressure map 408) may correspond to and/or may be the same as a size of the pressured area (e.g., an area in square centimeters (cm^2)). In examples, the ECU 106 may determine the size of the pressured area based on the pressure data, such as a pressure map (e.g., the pressure map 408) included in the pressure data. In determining the size of the pressure map and/or the pressured area, the ECU 106 may sum the areas of the one or more pressures 402, 404, and 406. In examples, the ECU 106 may determine the size of the pressure map and/or the pressured area based on a respective area of certain pressures and/or pressure categories. For example, the ECU 106 may ignore (e.g., filter out) the first pressure 402 and/or any pressure above the first pressure 402 when determining the total pressure and/or the size of the pressure map and/or the pressured area. In examples, in addition or alternatively, the ECU 106 may ignore (e.g., filter out) the third pressure 406 and/or any pressure below the third pressure 406 when determining the total pressure and/or the size of the pressure map and/or the pressured area. This may ensure that the ECU 106 ignores certain detected pressures that may be noise (e.g., that are not the result of a hand pressing the one or more pressure sensors 116) and/or may ensure a more accurate determination of the total pressure and/or the size of the pressured area (and/or of the size of the pressured area as it relates to a size of a hand of the user).

Figure 5:
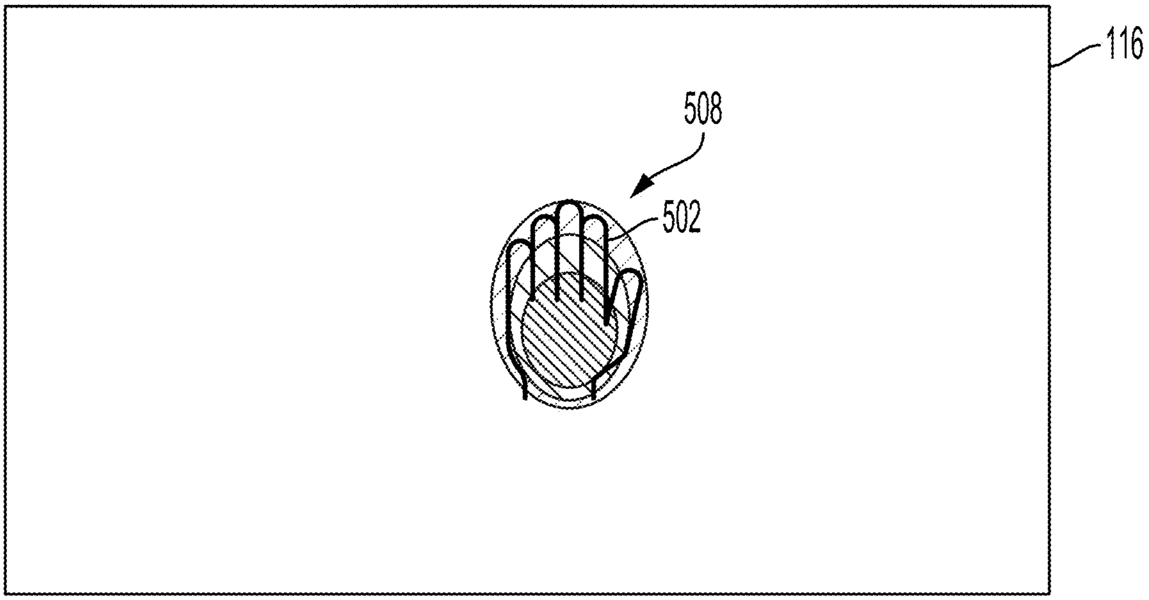
FIG. 5 illustrates an example pressure map indicated in pressure data that is detected by one or more pressure sensors and corresponds to a child user pressing the one or more pressure sensors according to an aspect of the disclosure.

FIG. 5 illustrates a pressure map 508 indicated or included in pressure data corresponding to a child hand 502 (e.g., of a child passenger of the vehicle 102) pressing the one or more pressure sensors 116 (e.g., that are coupled to the door panel upper 206 and/or the handle 208 or another location and/or component of the vehicle 102 that includes at least one of the one or more pressure sensors 116). With combined reference to FIGS. 4 and 5 with continuing reference to FIGS. 1 and 2, the size of a pressured area and/or a pressure map (e.g., the pressure map 408 or the pressure map 508) may correspond to a size of a hand (e.g., the adult hand 302 or the child hand 502) of a user (e.g., an adult driver or passenger of the vehicle 102 or a child passenger of the vehicle 102). For example, the size of the pressured area and/or the pressure map may be the same (or substantially the same) as the size (e.g., 60 square centimeters (cm^2), 100 square centimeters (cm^2), 140 square centimeters (cm^2), etc.) of the hand of the user.

The ECU 106 may be configured to determine the size of the hand of the user based on the pressure data. For example, when the adult hand 302 presses on the one or more pressure sensors 116, the pressured area and/or the pressure map 408 may have a determined size of 140 square centimeters (cm^2), for example (in examples, the pressured area and/or the pressure map 408 may have any other size). Accordingly, the ECU 106 may determine the size of the adult hand 302 to be 140 square centimeters (cm^2). In examples, the ECU 106 may determine the size of the adult hand 302 to be the size of the pressured area and/or the pressure map 408 minus a set number (e.g., 1 square centimeters (cm^2), 2 square centimeters (cm^2), etc.) and/or the size of the pressured area and/or the pressure map 408 multiplied by some percentage (e.g., 101%, 99%, 95%, etc.). This may increase the accuracy of the determination of the size of the adult hand 302 by accounting for differences in the size of the pressured area and/or the pressure map 408 and the adult hand 302.

When the child hand 502 presses on the one or more pressure sensors 116, the pressured area and/or the pressure map 508 may have a determined size of 80 square centimeters (cm^2), for example (in examples, the pressured area and/or the pressure map 508 may have any other size). Accordingly, the ECU 106 may determine the size of the child hand 502 to be 80 square centimeters (cm^2). In examples, the ECU 106 may determine the size of the child hand 502 to be the size of the pressured area and/or the pressure map 508 minus a set number (e.g., 1 square centimeters (cm^2), 2 square centimeters (cm^2), etc.) and/or the size of the pressured area and/or the pressure map 508 multiplied by some percentage (e.g., 101%, 99%, 95%, etc.). This may increase the accuracy of the determination of the size of the child hand 502 by accounting for differences in the size of the pressured area and/or the pressure map 508 and the child hand 502.

Figure 6:
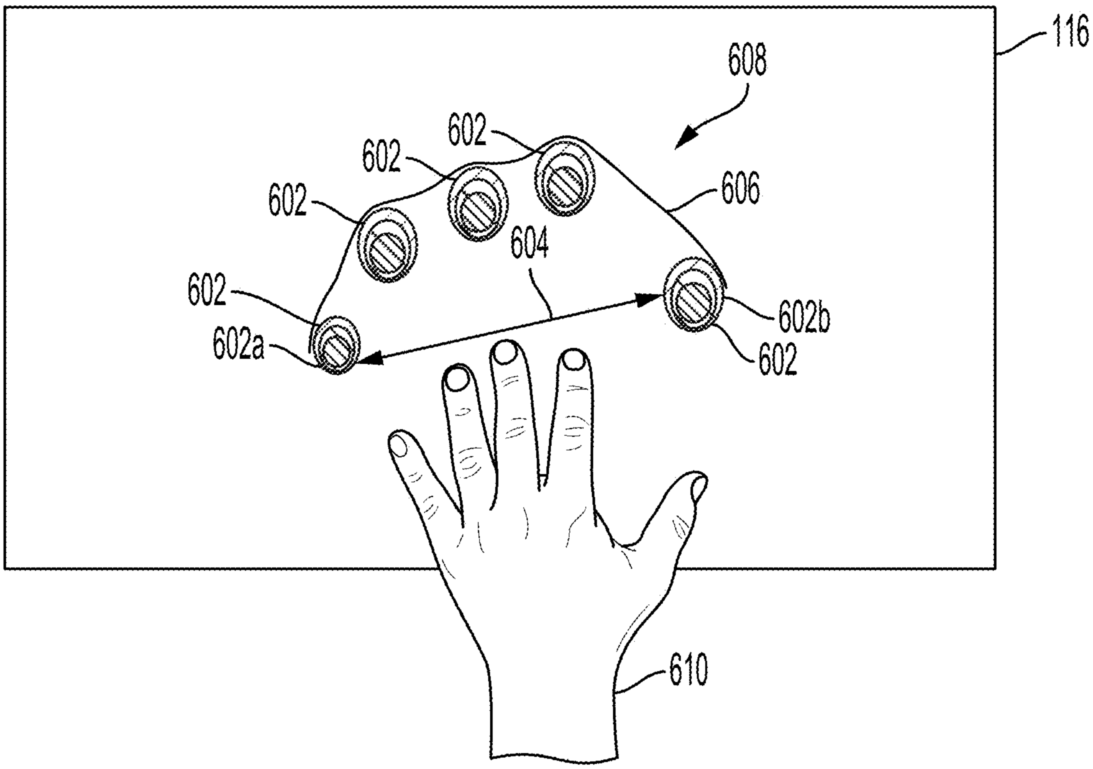
FIG. 6 illustrates an example pressure map indicated in pressure data that is detected by one or more pressure sensors and corresponds to a user pressing the one or more pressure sensors with the user's finger tips according to an aspect of the disclosure.

FIG. 6 illustrates an example pressure map 608 that may be indicated or included in pressure data detected by the one or more pressure sensors 116. The pressure map 608 may correspond to finger tips of a hand 610 pressing the one or more pressure sensors 116 (e.g., that are coupled to the door panel upper 206 and/or the handle 208 or another location and/or component of the vehicle 102 that includes at least one of the one or more pressure sensors 116). With reference to FIG. 6 and continuing reference to FIGS. 1 and 2, when the finger tips of the hand 610 press on the one or more pressure sensors 116, the pressure map 608 may include five pressure points 602 (or at least one pressure point for each finger tip pressing the one or more pressure sensors 116). The ECU 106 may be configured to determine the size of the hand 610 based on a distance between two or more of the pressure points 602.

For example, the ECU 106 may be configured to determine the size of the hand 610 based on a first distance 604 that is indicated or included in the pressure data and/or a second distance 606 that is indicated or included in the pressure data. In examples, the ECU 106 may determine the size of the hand 610 based on the first distance 604 and/or the second distance 606, and one or more tables that relate different first distances 604 and/or second distances 606 to respective hand sizes (e.g., 100 square centimeters (cm^2), 120 square centimeters (cm^2), etc.). The one or more tables may be stored on the memory 108, for example.

The first distance 604 may be or correspond to a hand span (e.g., the distance from a tip of a thumb to a tip of a little finger of the hand 610). The ECU 106 may determine the first distance 604 based on detecting, determining, or measuring the distance between two respective pressure points 602 that are furthest apart, such as a first pressure point 602*a* and a second pressure point 602*b*. The first distance 604 may correspond to a size of the hand 610 and accordingly may indicate whether the hand 610 is an adult hand or a child hand. In examples, the ECU 106 may determine the hand 610 is an adult hand when the first distance 604 is greater than or equal to a first predetermined distance (e.g., 10 centimeters (cm), 15 centimeters (cm), etc.) and may determine the hand 610 is a child hand when the first distance 604 is less than the first predetermined distance. The first predetermined distance may be stored on the memory 108.

In examples, the ECU 106 may select the two respective pressure points 602 that the ECU 106 will use to determine the first distance 604 based on a position of each of the pressure points 602 relative to each other. For example, the ECU 106 may select two pressure points 602 that are positioned lowest relative to the other pressure points 602. In examples, the ECU 106 may reject one or more of the pressure points 602 that are more than a set distance (e.g., 3 inches, 5 inches, etc.) away from one or more of the other pressure points 602.

In examples, the ECU 106 may select the two respective pressure points 602 that the ECU 106 will use to determine the first distance 604 based on the position of each of the pressure points 602 relative to each other, and/or the pressures/pressure categories of each of the pressure points 602. For example, the ECU 106 may reject pressure points 602 that are above or below certain pressures and/or that have areas that are smaller or larger than certain areas.

The second distance 606 may be or correspond to a finger spread or span. For example, the second distance 606 may be based on a distance around an outer perimeter of the five pressure points 602 as illustrated in FIG. 6, for example (in examples, the second distance 606 may be around an inner perimeter or through a center of each of the five pressure points 602). The ECU 106 may determine the second distance 606 based on detecting, determining, and/or measuring a distance from a tip of a thumb (e.g., the second pressure point 602*b*) to a tip of a little finger (e.g., the first pressure point 602*a*) and around an outer edge (or an inner edge) of the five pressure points 602 (or through a center of each of the five pressure points 602) as illustrated in FIG. 6, for example. The second distance 606 may correspond to a size of the hand 610 and accordingly may indicate whether the hand 610 is an adult hand or a child hand. In examples, the ECU 106 may determine the hand 610 is an adult hand when the second distance 606 is greater than or equal to the first predetermined distance or a second predetermined distance (e.g., 20 centimeters (cm), 25 centimeters (cm), etc.) and may determine the hand 610 is a child hand when the second distance 606 is less than the first predetermined distance or the second predetermined distance. The second predetermined distance may be stored on the memory 108.

Figure 7:
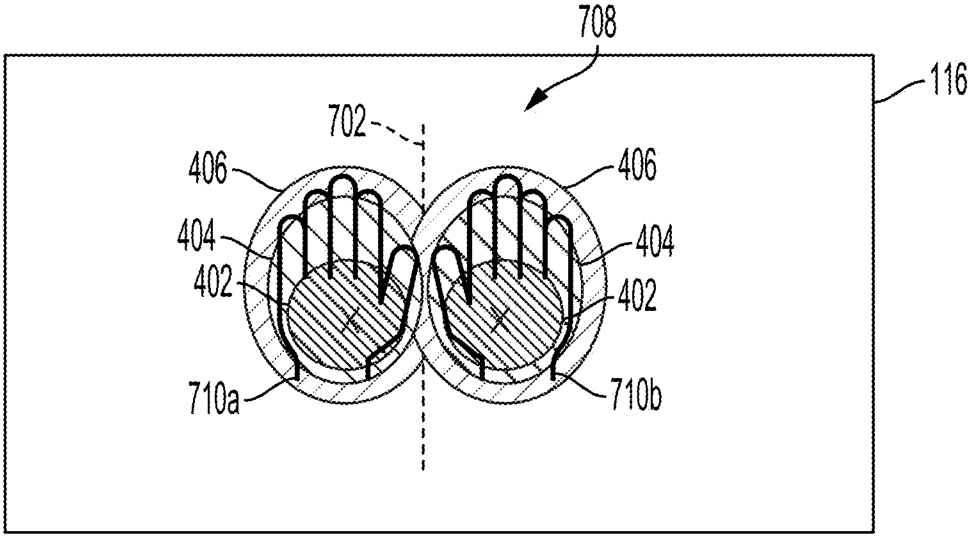
FIG. 7 illustrates an example pressure map indicated in pressure data that is detected by one or more pressure sensors and corresponds to a user pressing the one or more pressure sensors with the user's two hands according to an aspect of the disclosure.

FIG. 7 illustrates an example pressure map 708 that may be indicated or included in pressure data detected by the one or more pressure sensors 116. The pressure map 708 may correspond to two hands 710*a* and 710*b* (e.g., a left hand 710*a* and a right hand 710*b* of a driver and/or a passenger of the vehicle 102) pressing the one or more pressure sensors 116 (e.g., that are coupled to the door panel upper 206 and/or the handle 208 or another location and/or component of the vehicle 102 that includes at least one of the one or more pressure sensors 116). With reference to FIG. 7 and continuing reference to FIGS. 1 and 2, when two hands 710*a* and 710*b* press on the one or more pressure sensors 116, the size of the pressure map 708 and/or the pressured area may be larger than the size of an individual hand 710*a* or 710*b*. Accordingly, when a child uses two hands to press on the one or more pressure sensors 116, the child's two hands together may be similar in size to an adult's single hand.

To avoid misidentifying two child hands as a single adult hand, for example, the ECU 106 may be configured to determine that a user is pressing on the one or more pressure sensors 116 with two hands when the determined size of the pressure map 708 and/or the pressured area is greater than a single hand size threshold (e.g., 200 square centimeters (cm^2) or any other size). The single hand size threshold may be stored on the memory 108, for example.

In examples, in addition or alternatively, the ECU 106 may be configured to determine that a user is pressing on the one or more pressure sensors 116 with two hands based on detecting two first pressure 402 areas and/or detecting two centers of force (marked with X's in FIG. 7) (e.g., based on the pressure data and/or the pressure map 708). Each center of force X may be a determined center of a force (e.g., resulting from a hand) on the one or more pressure sensors 116.

In examples, in addition or alternatively, the ECU 106 may be configured to determine that a user is pressing on the one or more pressure sensors 116 with two hands based on a shape of the pressure map 708. For example, the ECU 106 may determine whether the pressure map 708 is shaped like two hands (e.g., based on a distribution of the one or more pressures 402, 404, 406).

When the ECU 106 determines that the user is pressing on the one or more pressure sensors 116 with two hands, the ECU 106 may determine the size of one of the hands 710*a* or 710*b* based on dividing the determined size of the pressure map 708 and/or the pressured area by two (2) (e.g., as illustrated by a line 702 in FIG. 7).

In examples, to avoid misidentifying two child hands as a single adult hand, for example, the ECU 106 may be configured to determine the size of a hand that is pressing on the one or more pressure sensors 116 when the user uses their fingers to press on the one or more pressure sensors 116 (e.g., as illustrated in FIG. 6), and not when the user uses their palms (e.g., as illustrated in FIGS. 4 and 7). For example, when the ECU 106 is configured to determine the size of a hand that is pressing on the one or more pressure sensors 116 when the user uses their fingers to press on the one or more pressure sensors 116, the ECU 106 may determine the first distance 604 (marked in FIG. 6) and/or the second distance 606 (marked in FIG. 6) based on selecting five (5) pressure points 602 (marked in FIG. 6) and rejecting or filtering any other pressure points (in examples, the ECU 106 may select a different number of pressure points 602). The ECU 106 may select the pressure points 602 based on a position of each of the pressure points 602 relative to each other (e.g., selecting the leftmost five (5) pressure points 602 or the rightmost five (5) pressure points 602).

A user (e.g., a driver and/or an owner of the vehicle 102) may configure the ECU 106 by selecting between one or more of the various ECU 106 configurations disclosed herein (e.g., via the user interface 110 and/or the user device 144). For example, the user may select how the ECU 106 avoids misidentifying two child hands as a single adult hand, among other options. In examples, the ECU 106 may be configured by a manufacturer of the vehicle 102 and not the user.

The ECU 106 may be configured to determine whether an adult or a child is pressing on the one or more pressure sensors 116 based on the size of a hand that is pressing the one or more pressure sensors 116. For example, the ECU 106 may be configured to determine a child is pressing on the one or more pressure sensors when the ECU 106 determines the size of the hand that is pressing on the one or more pressure sensors 116 is less than a hand size threshold (e.g., 100 square centimeters (cm^2)). The ECU 106 may be configured to determine an adult is pressing on the one or more pressure sensors 116 when the ECU 106 determines the size of the hand that is pressing on the one or more pressure sensors 116 is greater than or equal to the hand size threshold. The hand size threshold may be based on an average size of an adult's hand and/or an average size of a child's hand, in examples. The hand size threshold may be stored on the memory 108. In examples, the hand size threshold may be set by a manufacturer of the vehicle 102 and/or may be set and/or adjusted by a user (e.g., an owner of the vehicle 102) via the user interface 110 and/or the user device 144, for example.

In examples, the ECU 106 may be configured to determine whether an adult or a child is pressing on the one or more pressure sensors 116 based on the determined size of a hand that is pressing on the one or more pressure sensors 116, and a total force exerted by the hand that is pressing on the one or more pressure sensors 116. The ECU 106 may be configured to determine the total force based on the pressure data. For example, the ECU 106 may be configured to determine the total force based on the total pressure, the size of the pressured area and/or of the pressure maps 408, 508, 608, or 708, and/or the determined size of the hand that is pressing on the one or more pressure sensors 116. As an example, if the ECU 106 determines the total pressure is about 7000 pascals (Pa) and the size of the pressured area, the pressure maps 408, 508, 608, or 708, and/or the hand is 100 square centimeters (cm^2), the total force may be determined to be about 70 newtons (N).

The ECU 106 may be configured to determine a child is pressing on the one or more pressure sensors 116, and/or to prevent the electronic door latch 124 from being actuated, when the ECU 106 determines the size of the hand that is pressing on the one or more pressure sensors 116 is less than the hand size threshold (e.g., 100 square centimeters (cm^2)) and the total force is less than an opening force threshold (e.g., 50 newtons, 60 newtons, etc.). The ECU 106 may be configured to determine an adult is pressing on the one or more pressure sensors 116, and/or to actuate the electronic door latch 124, when the ECU 106 determines the size of the hand that is pressing on the one or more pressure sensors 116 is greater than or equal to the hand size threshold and the total force is greater than or equal to the opening force threshold. The opening force threshold may be based on an average force required to push the door 202 open, an average force exerted by a hand of a child when pushing on the door 202, and/or an average force exerted by a hand of an adult when pushing on the door 202, for example. The opening force threshold may be stored on the memory 108. In examples, the opening force threshold may be set by a manufacturer of the vehicle 102 and/or may be set and/or adjusted by a user (e.g., an owner of the vehicle 102) via the user interface 110 and/or the user device 144, for example.

The door latch system 100 may be configured to control (e.g., via the ECU 106) the electronic door latch 124 such that the door 202 may be opened when the ECU 106 determines that an adult is pressing on the one or more pressure sensors 116. The ECU 106 may be configured to prevent the door 202 from being opened when the ECU 106 determines that a child is pressing on the one or more pressure sensors 116.

In examples, the door latch system 100 may be configured to control (e.g., via the ECU 106) the electronic door latch 124 such that the door 202 may be opened when a child lock of the door latch system 100 is engaged and the ECU 106 determines that an adult is pressing on the one or more pressure sensors 116. The ECU 106 may be configured to prevent the door 202 from being opened when the ECU 106 determines that the child lock is engaged and a child is pressing on the one or more pressure sensors 116. The child lock may be a physical control (e.g., a button, a switch, etc.) that is coupled to the door 202 and/or a dashboard of the vehicle 102 and that may be engaged and disengaged by a driver of the vehicle 102, for example. In examples, the child lock may be engaged and disengaged via the user interface 110, for example. In examples, if the child lock is disengaged, the ECU 106 may not determine whether an adult or a child is pressing on the one or more pressure sensors 116, but may instead control (e.g., via the ECU 106) the electronic door latch 124 such that the door 202 may be opened when the ECU 106 detects that a hand is pressing on the one or more pressure sensors 116 (e.g., based on a size and/or a shape of a pressure map indicated in the pressure data) and/or when the total force is equal to or greater than the opening force threshold, for example.

In examples, the ECU 106 may not actuate the electronic door latch 124 when the ECU 106 determines that a total force on the one or more pressure sensors 116 is equal to or greater than a maximum opening force threshold (e.g., 100 Newtons (N), 150 Newtons (N), etc.). Accordingly, the ECU 106 may prevent the door 202 from opening when the user pushes too hard on the door 202. This may protect the door 202 and/or people or objects in a vicinity of the door 202 by preventing the door 202 from being opened too quickly and/or with too much force. The maximum opening force threshold may be stored on the memory 108, for example.

Referring back to FIG. 1 with continuing reference to FIG. 2, the door latch system 100 may further include the one or more touch sensors 112. The one or more touch sensors 112 may be and/or include one or more capacitive touch sensors, one or more thermal sensors, and/or one or more other touch sensors. The one or more touch sensors 112 may be coupled to the one or more pressure sensors 116 and/or to the door panel 204 (e.g., the door panel upper 206 and/or the handle 208). The one or more touch sensors 112 may be configured to detect and/or determine when a human hand is pressing on the one or more pressure sensors 116 versus, for example, another object such as cargo. The one or more touch sensors 112 may be configured to provide touch data to the ECU 106 indicating when a touch (e.g., on the door panel upper 206 and/or the handle 208) is from a human hand. Accordingly, the door latch system 100 (e.g., via the ECU 106) may be configured to reject objects pressing the one or more pressure sensors 116 such that the electronic door latch 124 is not actuated when the objects are not a human hand. For example, the ECU 106 may be configured to control the electronic door latch 124 such that the door 202 may be opened when the ECU 106 determines that an adult human hand is pressing on the one or more pressure sensors 116 based on the pressure data received from the one or more pressure sensors 116 and the touch data received from the one or more touch sensors 112. The ECU 106 may be configured to prevent the electronic door latch 124 from being actuated when the touch data indicates an object and not a human hand is pressing the one or more pressure sensors 116.

In examples, the pressure data from the one or more pressure sensors 116 may indicate when a touch (e.g., on the door panel upper 206 and/or the handle 208) is from a hand (e.g., based on a shape of a pressure map indicated or included in the pressure data).

In examples, the door latch system 100 may be configured to scan hands of respective users and set the hand size threshold based on the hand scans. For example, the one or more pressure sensors 116, the one or more touch sensors 112, and/or one or more other sensors of the vehicle 102 (e.g., a touchscreen of the user interface 110, one or more cameras coupled to the ECU 106 and positioned within a cabin of the vehicle 102, etc.) may be configured to detect, measure, and/or determine hand scan data by performing one or more scans of one or more hands of one or more respective users. In examples, one or more sensors that are not electrically connected to (but are in communication with) the ECU 106 may detect, measure, and/or determine the hand scan data and provide the hand scan data to the ECU 106. The hand scan data may indicate or include a hand size of each of the one or more hands. The ECU 106 may be configured to receive the hand scan data corresponding to the one or more scans of the one or more hands, and set the hand size threshold based on the received hand scan data. The hand scan data may indicate a hand size of one or more adult drivers and/or adult passengers of the vehicle 102, for example. This may enable a vehicle owner to set multiple hand sizes that may actuate the electronic door latch 124.

For example, a user (e.g., an owner of the vehicle 102) may set the hand size threshold based on their hand size, for example, such that users with smaller hands may not open the door 202. In examples, multiple users (e.g., certain members of a family) may scan or manually enter their hand size (e.g., via the user interface 110, the user device 144, etc.) such that the hand size threshold includes multiple stored hand sizes enabling each of the multiple users to open the door 202. Users with smaller hands and/or a different hand size than the stored hand sizes may be prevented from opening the door 202.

Figure 8:
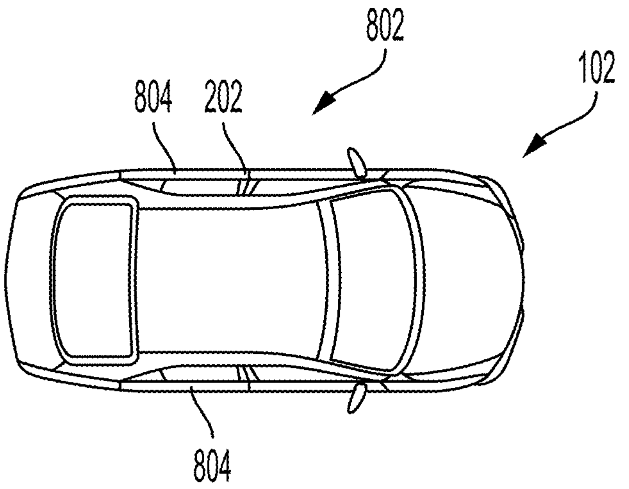
FIG. 8 illustrates a top view of a vehicle according to an aspect of the disclosure.
Figure 9:
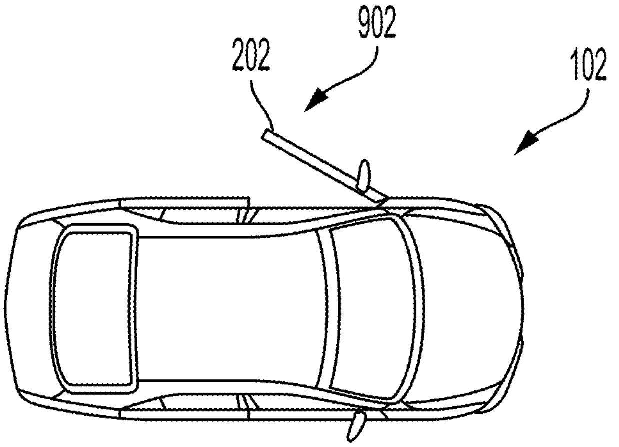
FIG. 9 illustrates a top view of the vehicle of FIG. 8 with a door of the vehicle in a partially open position according to an aspect of the disclosure.
Figure 10:
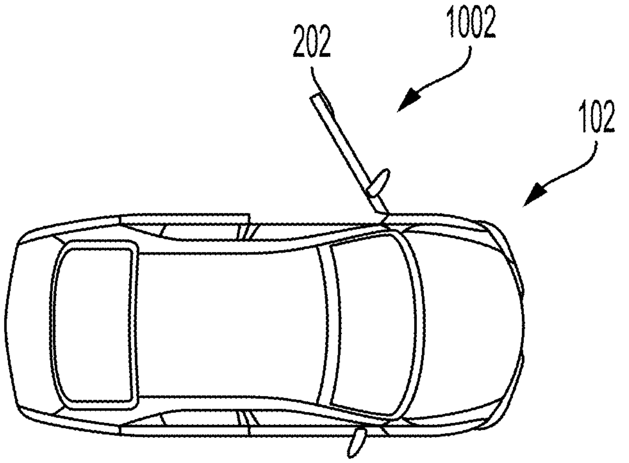
FIG. 10 illustrates a top view of the vehicle of FIG. 8 with a door of the vehicle in an open position according to an aspect of the disclosure.

FIGS. 8-10 illustrate top views of the door 202 of the vehicle 102 opening. With reference to FIGS. 8-10 and continuing reference to FIGS. 1 and 2, when the door 202 is in a closed position 802 (marked in FIG. 8), a user (e.g., an adult driver and/or an adult passenger of the vehicle 102) may press one or more portions of the door panel 204 (marked in FIG. 2) that include the one or more pressure sensors 116 (marked in FIGS. 1 and 2) to actuate the electronic door latch 124 (marked in FIGS. 1 and 2) to open the door 202 to an open position 1002 (marked in FIG. 10) as described herein.

In examples, the door latch system 100 may physically stop the door 202 while the door 202 is being opened when the pressure data indicates the user is no longer pressing the one or more pressure sensors 116. Accordingly, to open the door 202 from the closed position 802 to the open position 1002, the user may be required to press the one or more pressure sensors 116 to open the door 202 and continue to press the one or more pressure sensors 116 until the door 202 is in the open position 1002, in examples. If the user stops pressing the one or more pressure sensors 116 while opening the door 202, the door 202 may be stopped in a partially opened position 902 as illustrated in FIG. 9, for example. The user may resume opening the door 202 by pressing on the one or more pressure sensors 116 or may close the door 202 by pulling the door 202 closed.

In examples, the door latch system 100 may further include the one or more actuators 122 (marked in FIG. 1). The one or more actuators 122 may be and/or include one or more electric motors, one or more electric linear actuators, one or more hydraulic actuators, and/or one or more pneumatic actuators. The one or more actuators 122 may be electrically connected to the ECU 106. The one or more actuators 122 may be coupled to the main body 212 of the vehicle 102, the one or more hinges 210, and/or the door 202.

The one or more actuators 122 may be configured to move (or assist with moving) the door 202 between the closed position 802 and the open position 1002. For example, the one or more actuators 122 may move the door 202 from the closed position 802 to the open position 1002 when the ECU 106 actuates the electronic door latch 124 and controls the one or more actuators 122 to move the door 202. In examples, the one or more actuators 122 may physically stop the door 202 in the partially opened position 902 when the user stops pressing the one or more pressure sensors 116 as described herein.

Figure 11:
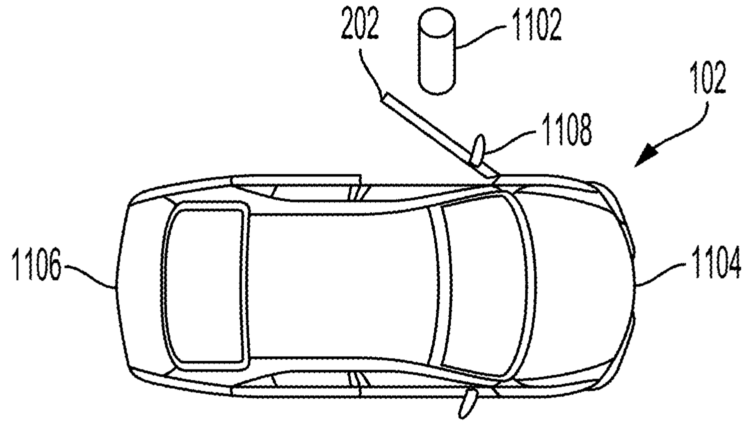
FIG. 11 illustrates a top view of the vehicle of FIG. 8 with a door of the vehicle stopped in a partially open position according to an aspect of the disclosure.

FIG. 11 illustrates a top view of the vehicle 102. With reference to FIGS. 1 and 11, the door latch system 100 may further include the one or more distance (or object) sensors 118. The one or more distance sensors 118 may be and/or include one or more of a camera, a radar sensor, an ultrasonic sensor, a lidar sensor, and/or another distance measuring or object detecting sensor. The one or more distance sensors 118 may be coupled to and/or positioned at one or more side view mirrors 1108 of the vehicle 102, a front bumper 1104 of the vehicle 102, a rear bumper 1106 of the vehicle 102, a front or rear fender of the vehicle 102, and/or other components of the vehicle 102. The one or more distance sensors 118 may be electrically connected to the ECU 106.

The one or more distance sensors 118 may be configured to detect when one or more objects 1102 (e.g., a pole) are in a movement or swing path of the door 202. The one or more distance sensors 118 may be configured to provide object data to the ECU 106 indicating that the one or more objects 1102 are in the movement or swing path of the door 202. The ECU 106 may be configured to determine whether the door 202 will contact the one or more objects 1102 based on the object data received from the one or more distance sensors 118 and may stop the door 202 from opening (e.g., by not actuating the electronic door latch 124) and/or may stop the door 202 while the door 202 is opening (e.g., by controlling the one or more actuators 122) to prevent the door 202 from contacting the one or more objects 1102.

Figure 12:
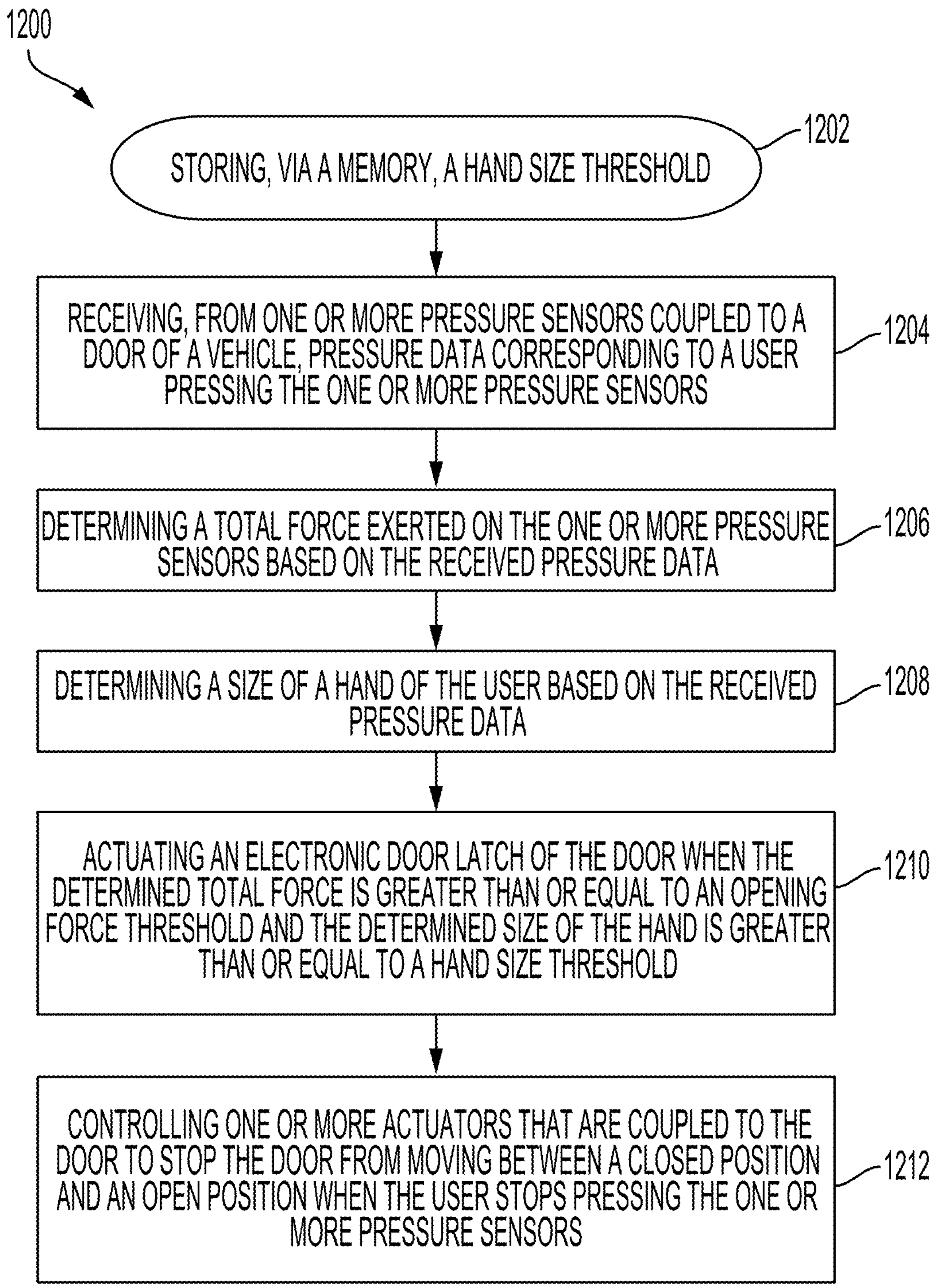
FIG. 12 is a flow diagram of an example process for controlling the door latch system of FIG. 1 according to an aspect of the disclosure.

FIG. 12 is a flow diagram of an example process 1200 for controlling the door latch system 100. One or more computers or one or more data processing apparatuses, for example, the ECU 106 of the door latch system 100 of FIG. 1, appropriately programmed, may implement the process 1200. For ease of description, the process 1200 is described below with reference to FIGS. 1-11. The process 1200 of the present disclosure, however, is not limited to use of the exemplary door latch systems of FIGS. 1-11.

The door latch system 100 may store (e.g., via the memory 108), a hand size threshold (1202). In examples, the hand size threshold may be manually entered and/or selected by a user (e.g., via the user interface 110 and/or the user device 144). In examples, the ECU 106 may receive hand scan data corresponding to one or more scans of one or more hands, with the hand scan data indicating a size of each of the one or more hands. The ECU 106 may set the hand size threshold based on the received hand scan data and store the hand size threshold on the memory 108, for example.

The door latch system 100 may receive, from the one or more pressure sensors 116, pressure data corresponding to a user pressing the one or more pressure sensors 116 (1204).

The door latch system 100 may determine (e.g., via the ECU 106) a total force exerted on the one or more pressure sensors 116 based on the received pressure data (1206).

The door latch system 100 may determine (e.g., via the ECU 106) a size of a hand of the user based on the received pressure data (1208).

The door latch system 100 may actuate the electronic door latch 124 of the door 202 (e.g., such that the door 202 may open) when the determined total force is greater than or equal to an opening force threshold, and the determined size of the hand is greater than or equal to the hand size threshold (1210).

The door latch system 100 may control the one or more actuators 122 to stop the door 202 from moving between the closed position 802 and the open position 1002 when the user stops pressing the one or more pressure sensors 116 (1212).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A door latch system for a vehicle, comprising:
a body of the vehicle;
a door coupled to the body and configured to move between a closed position and an open position for ingress and egress of the vehicle by a user;
a door latch coupled to the door and configured to prevent the door moving from the closed position to the open position until the door latch is actuated;
one or more pressure sensors coupled to an interior surface of the door and configured to detect pressure data corresponding to the user pressing the one or more pressure sensors, the pressure data indicating a pressure map corresponding to a distribution of pressure on the one or more pressure sensors; and
an electronic control unit (ECU) coupled to the door latch and the one or more pressure sensors, the ECU being configured to:
receive the pressure data from the one or more pressure sensors when the user presses the one or more pressure sensors;
determine a total force exerted on the one or more pressure sensors based on the received pressure data;
determine a size of a hand of the user based on a size of the pressure map indicated in the received pressure data; and
actuate the door latch to open the door when:
the determined total force is equal to or greater than an opening force threshold; and
the determined size of the hand is equal to or greater than a hand size threshold.

2. The door latch system of claim 1, wherein:
the pressure data indicates a pressured area of the one or more pressure sensors, the pressured area corresponding to where the hand is pressing on the one or more pressure sensors; and
the determination of the size of the hand is based on a size of the pressured area indicated in the received pressure data.

3. The door latch system of claim 2, wherein:
the ECU is further configured to determine whether the user is pressing on the one or more pressure sensors with two hands of the user based on the pressured area indicated in the received pressure data; and
the determination of the size of the hand of the user includes dividing the size of the pressured area by two when the user is determined to be pressing on the one or more pressure sensors with the two hands of the user.

4. The door latch system of claim 1, wherein:
the pressure data indicates a plurality of pressure points on the one or more pressure sensors, the plurality of pressure points corresponding to finger tips of the hand of the user pressing on the one or more pressure sensors; and
the determination of the size of the hand of the user is based on a distance between two or more pressure points of the plurality of pressure points.

5. The door latch system of claim 1, wherein the ECU is further configured to stop or prevent the door latch from being actuated when the determined total force is equal to or greater than a maximum opening force threshold.

6. The door latch system of claim 1, further comprising one or more actuators coupled to the door and the ECU, the one or more actuators being configured to stop movement of the door from the closed position to the open position such that the door is positioned in a partially open position; and
wherein the ECU is further configured to control the one or more actuators to stop the door in the partially open position when the user stops pressing on the one or more pressure sensors.

7. The door latch system of claim 1, further comprising one or more touch sensors coupled to the door and the ECU, the one or more touch sensors being configured to detect touch data indicating whether a human hand or an object is pressing on the one or more pressure sensors; and
wherein the ECU is configured to stop or prevent the door latch from being actuated when the touch data indicates the object is pressing on the one or more pressure sensors and not the human hand.

8. The door latch system of claim 1, wherein:
the door includes an interior door panel, the interior door panel including an upper portion and/or a handle; and
the one or more pressure sensors are coupled to the upper portion and/or the handle of the interior door panel.

9. The door latch system of claim 1, further comprising a memory coupled to the ECU and configured to store the opening force threshold and the hand size threshold; and
wherein the ECU is further configured to set the opening force threshold and/or the hand size threshold based on user input data received via a user interface of the vehicle and/or a user device in wireless communication with the ECU.

10. The door latch system of claim 1, wherein the ECU is further configured to:
receive hand scan data corresponding to one or more scans of one or more hands, the hand scan data indicating a size of each of the one or more hands; and
set the hand size threshold based on the received hand scan data.

11. A door latch system for a vehicle, comprising:

a body of the vehicle;

a door coupled to the body and configured to move between a closed position and an open position for ingress and egress of the vehicle by a user;

a door latch coupled to the door and configured to prevent the door moving from the closed position to the open position until the door latch is actuated;

one or more pressure sensors coupled to an interior surface of the door and configured to detect pressure data corresponding to the user pressing the one or more pressure sensors, the pressure data indicating a pressure map corresponding to a distribution of pressure on the one or more pressure sensors; and an electronic control unit (ECU) coupled to the door latch and the one or more pressure sensors, the ECU being configured to:

receive hand scan data corresponding to one or more scans of one or more hands, the hand scan data indicating a size of each of the one or more hands;

receive the pressure data from the one or more pressure sensors when the user presses the one or more pressure sensors;

determine a size of a hand of the user based on a size of the pressure map indicated in the received pressure data; and actuate the door latch to open the door when the determined size of the hand is equal to or greater than a hand size threshold, the hand size threshold being based on the received hand scan data.

12. The door latch system of claim 11, wherein the ECU is further configured to:

determine a total force exerted on the one or more pressure sensors based on the received pressure data; and stop or prevent the door latch from being actuated when the determined total force is less than an opening force threshold.

13. The door latch system of claim 11, wherein:

the pressure data indicates a pressured area of the one or more pressure sensors, the pressured area corresponding to where the hand of the user is pressing on the one or more pressure sensors; and the determination of the size of the hand of the user is based on a size of the pressured area indicated in the received pressure data.

14. The door latch system of claim 13, wherein:

the ECU is further configured to determine whether the user is pressing on the one or more pressure sensors with two hands of the user based on the pressured area indicated in the pressure data; and the determination of the size of the hand of the user includes dividing the size of the pressured area by two when the user is determined to be pressing on the one or more pressure sensors with the two hands of the user.

15. The door latch system of claim 11, wherein:

the pressure data indicates a plurality of pressure points on the one or more pressure sensors, the plurality of pressure points corresponding to finger tips of the hand pressing on the one or more pressure sensors; and the determination of the size of the hand is based on a distance between two or more pressure points of the plurality of pressure points.

16. The door latch system of claim 11, wherein the ECU is further configured to stop or prevent the door latch from being actuated when the determined total force is equal to or greater than a maximum opening force threshold.

17. The door latch system of claim 11, further comprising one or more actuators coupled to the door and the ECU, the one or more actuators being configured to stop movement of the door from the closed position to the open position such that the door is positioned in a partially open position; and wherein the ECU is further configured to control the one or more actuators to stop the door in the partially open position when the user stops pressing on the one or more pressure sensors.

18. The door latch system of claim 11, further comprising one or more touch sensors coupled to the door and the ECU, the one or more touch sensors being configured to detect touch data indicating whether a human hand or an object is pressing on the one or more pressure sensors; and wherein the ECU is configured to stop or prevent the door latch from being actuated when the touch data indicates the object is pressing on the one or more pressure sensors and not the human hand.

19. The door latch system of claim 11, wherein:

the door includes an interior door panel, the interior door panel including an upper portion and/or a handle; and the one or more pressure sensors are coupled to the upper portion and/or the handle of the interior door panel.

20. The door latch system of claim 11, further comprising a memory coupled to the ECU and configured to store the opening force threshold and the hand size threshold; and wherein the ECU is further configured to set the opening force threshold and/or the hand size threshold based on user input data received via a user interface of the vehicle and/or a user device in wireless communication with the ECU.

* * * * *